(12) United States Patent
Kitahara et al.

(10) Patent No.: US 6,619,140 B2
(45) Date of Patent: Sep. 16, 2003

(54) FLUID FLOW METER HAVING THERMAL FLOW SENSOR DISPOSED IN ONE OF A PLURALITY OF FLUID PASSAGES

(75) Inventors: Noboru Kitahara, Nishio (JP); Takao Ban, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/865,724

(22) Filed: May 29, 2001

(65) Prior Publication Data
US 2001/0049970 A1 Dec. 13, 2001

(30) Foreign Application Priority Data

May 30, 2000 (JP) .......................... 2000-159753
May 8, 2001 (JP) .......................... 2001-137262

(51) Int. Cl.[7] .............. G01F 1/37; G01F 1/68
(52) U.S. Cl. ............... 73/861.52; 73/204.21; 73/202.5
(58) Field of Search .............. 73/861.52, 204.21, 73/204.24, 204.22, 118.2, 202.5, 202

(56) References Cited

U.S. PATENT DOCUMENTS

| 4,213,335 A | * | 7/1980 | Peter et al. ............. 73/204.15 |
| 4,981,035 A | * | 1/1991 | Hall ........................ 73/118.2 |
| 5,086,650 A | * | 2/1992 | Harrington et al. ....... 73/204.21 |
| 5,537,870 A | | 7/1996 | Zurek et al. |
| 5,631,417 A | | 5/1997 | Harrington et al. |
| 5,644,079 A | | 7/1997 | Rilling et al. |
| 5,925,820 A | | 7/1999 | Tank et al. |
| 5,948,975 A | | 9/1999 | Mueller et al. |
| 6,079,264 A | | 6/2000 | Yamakawa et al. |
| 6,148,663 A | | 11/2000 | Stahl et al. |
| 6,336,360 B1 | * | 1/2002 | Weber ..................... 73/204.21 |

FOREIGN PATENT DOCUMENTS

| DE | 198 15 654 | 10/1999 |
| WO | WO99/53274 | 10/1999 |

* cited by examiner

Primary Examiner—Edward Lefkowitz
Assistant Examiner—C. Dickens
(74) Attorney, Agent, or Firm—Nixon & Vanderhye P.C.

(57) ABSTRACT

A separator partitions an upstream side air passage of a bypass passage into first and second sub passages. A thermal flow sensor is attached to the separator facing the first sub passage. A convex is formed on the inner wall of an outer pipe defining the second sub passage. The convex protrudes toward the separator. Minimum flow passage area S2 of the second sub passage is smaller than minimum flow passage area S1 of the first sub passage, so that flow passage loss of the second sub passage is larger than flow passage loss of the first sub passage. Thus, measured air-flow amount average when the air-flow pulsates is corrected to be larger.

14 Claims, 6 Drawing Sheets

BYPASS FLOW

BYPASS FLOW

BYPASS FLOW

BYPASS FLOW

BYPASS FLOW

BYPASS FLOW

US 6,619,140 B2

FLUID FLOW METER HAVING THERMAL FLOW SENSOR DISPOSED IN ONE OF A PLURALITY OF FLUID PASSAGES

CROSS REFERENCE TO RELATED APPLICATION

This application is based on Japanese Patent Application Nos. 2000-159753 filed on May 30, 2000, and 2001-137262 filed on May 8, 2001.

BACKGROUND OF THE INVENTION

1. Field of the Invention

The present invention relates to a fluid flow meter having a thermal flow sensor, suitable for use in an intake pipe of vehicle internal combustion engine.

2. Description of Related Art

An air flow meter measuring intake air flow amount of a vehicle engine uses a thermal flow sensor including a heating resistor. The air flow meter detects a change of heat absorbed by the air-flow from a portion where the heating resistor heats, or a change of temperature in the vicinity of the heated portion, thereby attaining the air flow amount.

Since the heat capacity of the thermal flow sensor is small, air-flow turbulence might cause a measurement error. U.S. Pat. No. 5,631,417 discloses an air flow meter in which a fluid passage provided with a thermal flow sensor is smoothly restricted to reduce a turbulence of the air flowing toward the thermal flow sensor. JP-A-10-293052 discloses an air flow meter in which a detecting pipe is disposed within a fluid passage and a supporter into which a thermal flow sensor is installed is disposed within the detecting pipe. The width of the supporter gradually increases from an end in an air-flow direction to a position where the thermal flow sensor is installed, for reducing a turbulence of the air flowing toward the thermal flow sensor.

In general, relations between the air flow amount and the heat absorbed by the air flow from the portion heated by the heating resistor, and the air flow amount and the change of temperature around the heated portion are not linear. Further, response of change of the heat absorbed by the air-flow from the heated portion, and response of the temperature around the heated portion are delayed with respect to the change of air-flow amount. Thus, when the air-flow pulsates due to high-load operation of the engine, measured flow amount average might be smaller than actual air-flow amount average. Here, in case of the thermal flow sensor is installed in a vehicle intake air apparatus such as air-cleaner, error amount of the measured flow amount average varies in accordance with a shape of fluid passage and a disposed position of the air flow meter, and the measured flow amount average deviates from the actual measured flow amount average to larger or smaller than the actual measured flow amount.

In the air flow meter disclosed in the U.S. Pat. No. 5,631,417, since the fluid passage to which the thermal flow sensor is disposed is restricted, flow passage loss thereof is increased. Thus, when the air-flow pulsates, measured flow amount average tends to be smaller than actual flow amount average. In the air flow meter disclosed in JP-A-10-293052, since the supporter into which the thermal flow sensor is installed is disposed within the detecting pipe, flow passage loss thereof is increased. Thus, when the air-flow pulsates, measured flow amount average tends to be smaller than actual flow amount average.

SUMMARY OF THE INVENTION

An object of the present invention is to measure fluid flow amount highly accurately even when the fluid flow pulsates.

According to the present invention, a flow passage resistance difference generating member is provided at an inner wall of at least one of first and second sub fluid passages. The flow passage resistance difference generating member works as a flow resistor for the fluid flowing through at least one of the first and second sub fluid passages. Flow passage losses of the first and second sub fluid passages are different from each other due to the flow passage resistance difference generating member. Thus, measured flow amount average when the fluid flow pulsates is corrected to be either larger or smaller by adjusting the flow passage losses of the first and second sub fluid passages by changing size and/or shape of the flow passage resistance difference generating member without changing length and/or fluid passage area of the sub fluid passages. In this way, the actual flow amount is highly accurately measured even when the fluid flow pulsates.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1A:
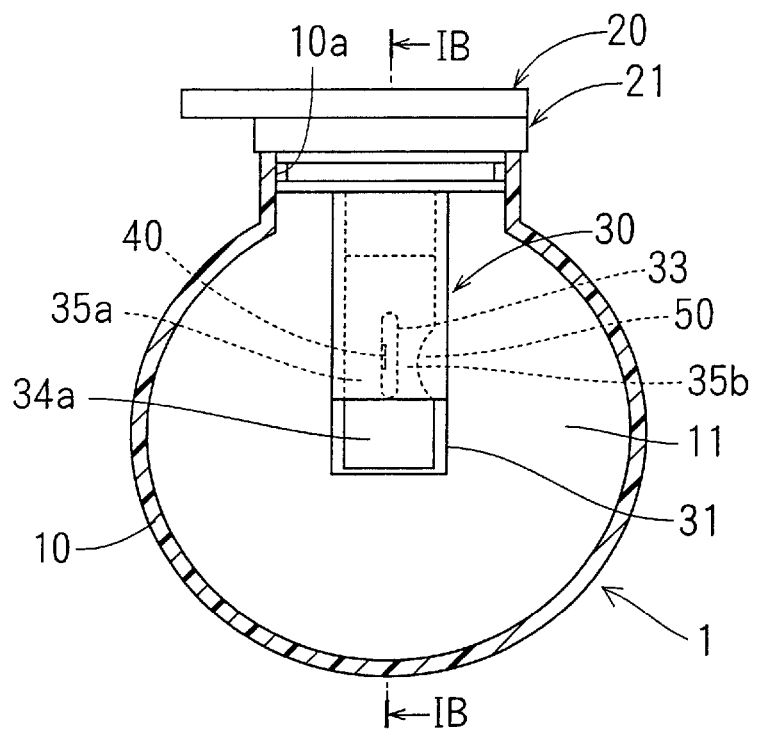
FIG. 1A is a schematic cross-sectional view showing an air flow meter (first embodiment)
Figure 1B:
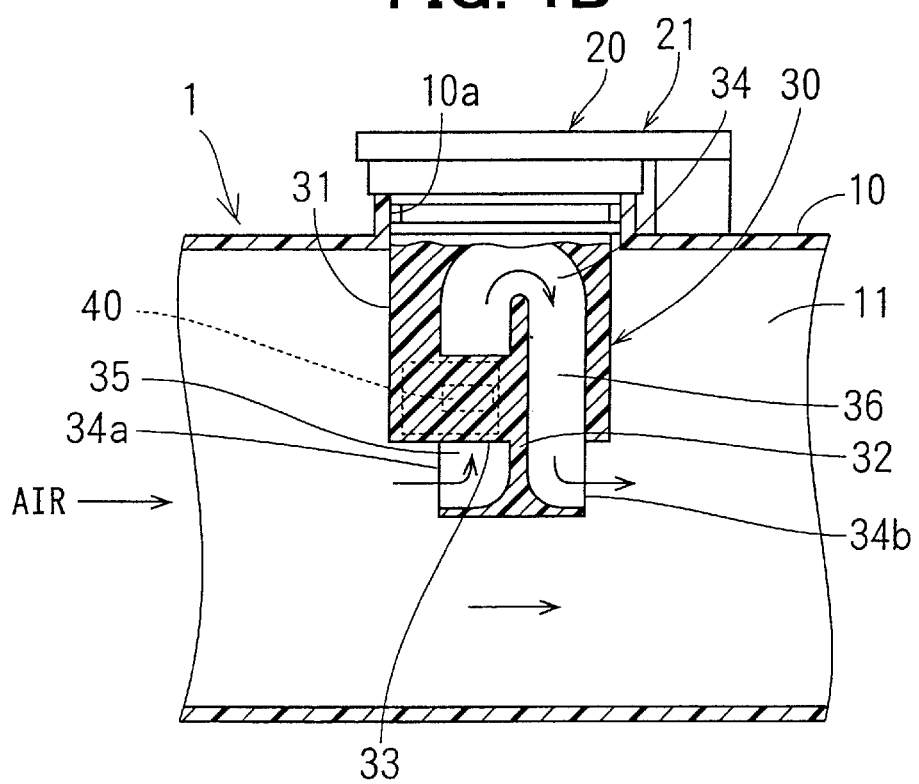
FIG. 1B is a cross-sectional view taken along line IB—IB in FIG. 1A (first embodiment)

As shown in FIGS. 1A and 1B, an air flow meter 1 includes an intake pipe 10, a sensor portion 20, a circuit module 21, a flow meter unit 30, and a thermal flow sensor 40. The flow meter unit 30 is attached to a mounting hole 10a of the intake pipe 10 of internal combustion engine, and disposed in an air passage 11 being a primary air passage.

A control circuit of the circuit module 21 electrically connects to the thermal flow sensor 40 installed within the flow meter unit 30. The thermal flow sensor 40 outputs a signal in accordance with air-flow amount. The control circuit converts the signal into a flow amount signal, and the converted signal is sent to an engine control unit (ECU) through a wire harness.

The flow meter unit 30 includes an outer pipe 31, a partition wall 32, and a separator 33 for forming a bypass passage 34. The partition wall 32 extends from a bottom of the outer pipe 31 toward the circuit module 21. The bypass passage 34 is defined by an inner wall of the outer pipe 31 and the partition wall 32, and is formed in a U-shape perpendicularly to the primary air-flow in the air passage 11. An inlet 34a and an outlet 34b of the bypass passage 34 are located within the air passage 11. The inlet 34a opens toward the air upstream side of the air passage 11, and the outlet 34b opens toward the air downstream side of the air passage 11.

The bypass passage 34 includes an upstream side air passage 35 and a downstream side air passage 36. The air is introduced into the upstream side air passage 35 through the inlet 34a and flows in the upstream side air passage 35 radially upwardly. The downstream side air passage 36 is arranged in parallel with the upstream side air passage 35, and the air flows in the downstream side air passage radially downwardly.

Figure 2:
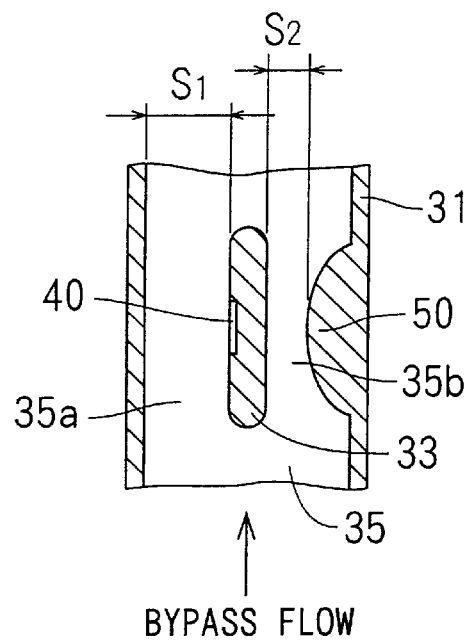
FIG. 2 is a schematic cross-sectional view showing around a thermal flow sensor (first embodiment)

As shown in FIG. 2, the separator 33 extends along the primary air-flow in the air passage 11 and along the bypass air-flow in the upstream side air passage 35. The inner wall of the outer pipe 31 and the partition wall 32 support the separator 33. The separator 33 divides the upstream side air passage 35 into first and second sub air passages 35a and 35b. The thermal flow sensor 40 is attached to the first sub air passage 35a side of the separator 33.

A convex portion 50 is formed on the inner wall of the outer pipe 31 forming the second sub air passage 35b. The convex 50 includes a curved surface and protrudes toward the separator 33. Minimum flow passage area S2 of the second sub air passage 35b is smaller than minimum flow passage area S1 of the first sub air passage 35a. That is, flow passage loss of the second sub air passage 35b is larger than flow passage loss of the first sub air passage 35a.

Figure 3A:
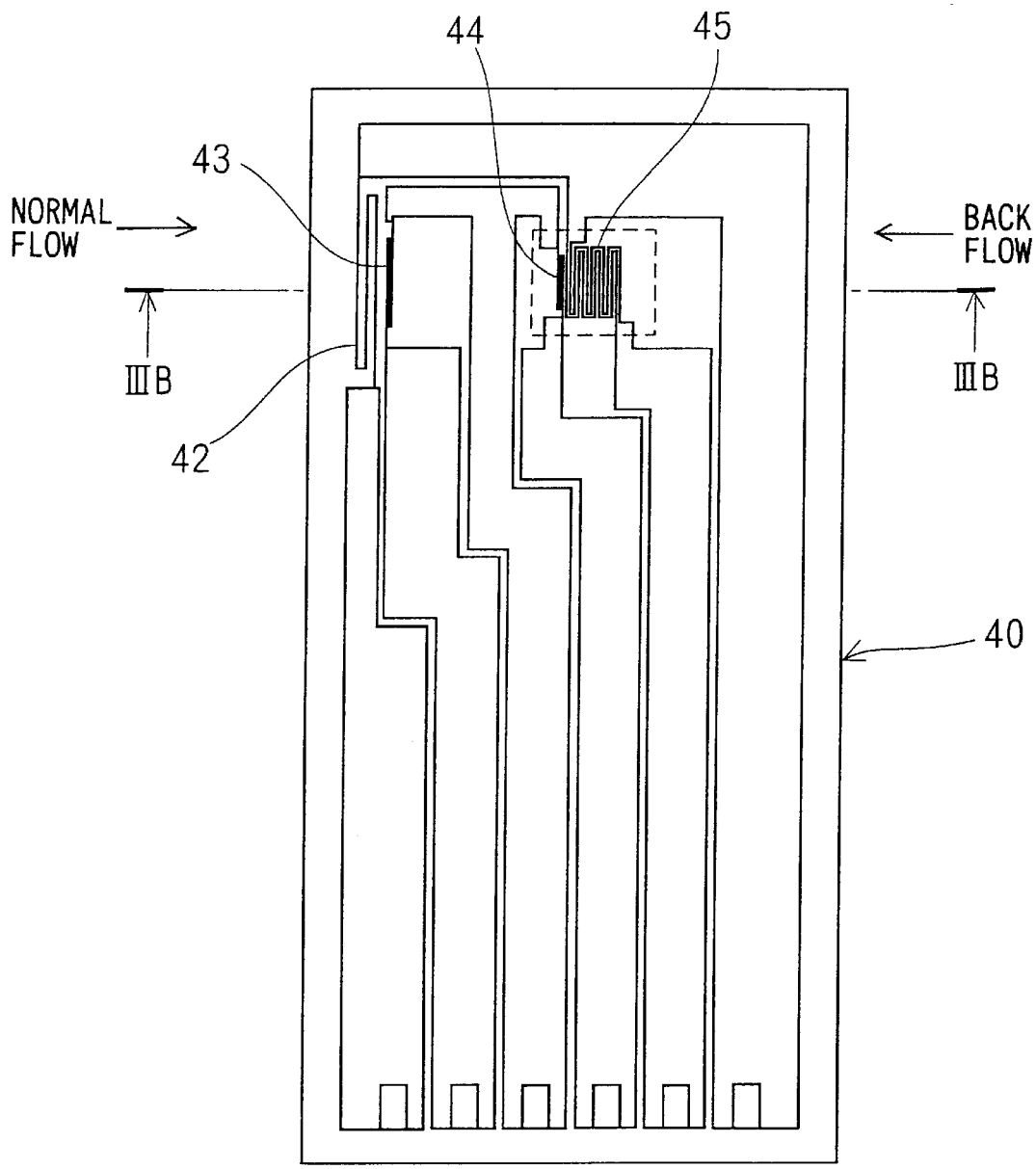
FIG. 3A is a plan view showing around the thermal flow sensor (first embodiment)
Figure 3B:
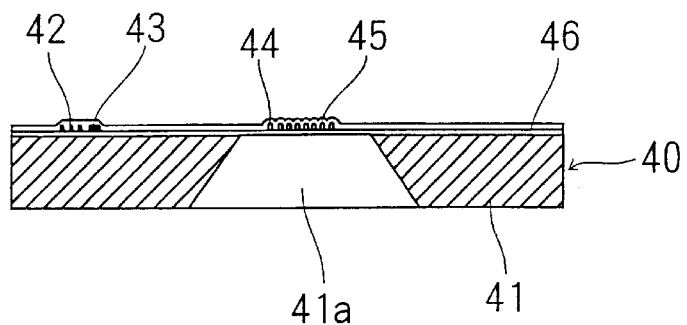
FIG. 3B is a cross-sectional view taken along line IIIB—IIIB in FIG. 3A (first embodiment)

As shown in FIGS. 3A and 3B, the thermal flow sensor 40 includes a semiconductor board 41, intake air temperature detecting resistors 42, 43, a flow amount detecting resistor 44, and a heating resistor 45, and an insulating film 46. The semiconductor board 41 is made of silicon. The intake air temperature detecting resistors 42, 43, the flow amount detecting resistor 44, and the heating resistor 45 are formed on the insulating film 46 in such a manner that they are arranged in this order from the air upstream side. The intake air temperature detecting resistor 42 detects an intake air temperature, and is disposed sufficiently far from the heating resistor 45 so that heat of the heating resistor 45 does not influence the temperature detection. The flow amount detecting resistor 44 detects a temperature including intake air temperature data and intake air flow amount data. The intake air temperature detecting resistor 43 removes the intake air temperature data from the temperature detected by the flow amount detecting resistor 44. The flow amount detecting resistor 44 is disposed at the air upstream side of the heating resistor 45.

The heating resistor 45 is controlled to have a standard temperature being higher than the intake air temperature detecting resistor 42 by a constant temperature. The semiconductor board 41 includes a hole 41a at a position where the flow amount detecting resistor 44 and the heating resistor 45 are located. The insulating film 46 covers over the semiconductor board including the hole 41a.

The flow amount detecting resistor 44 is disposed in the vicinity of the air upstream portion of the heating resistor 45. Thus, detected temperature by the flow amount detecting resistor 44 is lower than the standard temperature of the heating resistor 45 when the intake air normally flows, and is higher than the standard temperature when the intake air flows backwardly. The thermal flow sensor 40 detects air-flow amount and air-flow direction by detecting the temperature change of the flow amount detecting resistor 44 through the control circuit of the circuit module 21. Here, the heating resistor 45 heats the flow amount detecting resistor 45 by electric current from the circuit module 21.

An operation of the air-flow sensor 10 will be explained.

In the thermal flow sensor 40, relations between the air flow amount and the heat absorbed by the air flow from the flow amount detecting resistor 44, and the air flow amount and the change of temperature around the flow amount detecting resistor 44 are not linear. Further, response of the heat absorbed by the air-flow from the flow amount detecting resistor 44 is delayed with respect to the change of air-flow amount. Due to such a characteristic of the thermal flow sensor 40, shape of air passage and disposed position of the sensor portion 20, in the present embodiment, when the air-flow pulsates in the air passage 11, measured air flow amount average is smaller than actual air flow amount average.

Length of the bypass passage 35 from the inlet 34a to the outlet 34b is larger than the width of the bypass passage 35 in the primary air-flow direction in the air passage 11. Thus, flow passage length ratio (bypass passage length)/(primary air passage length) is large. Therefore, when the air-flow pulsates, the measured air-flow amount average is corrected to be larger. In the first embodiment, only the correction at the upstream side air passage 35 insufficiently correct the measured air-flow amount average to be larger during the air flow pulsation.

When flow passage loss ratio (primary air passage loss)/(bypass passage loss) is made large, the measured air-flow amount average is corrected to be large. Here, the second sub air passage 35b at which the thermal flow sensor 40 is not disposed corresponds to the fluid flow passage, and the first sub air passage 35a at which the thermal flow sensor 40 is disposed corresponds to the bypass passage. As described above, the minimum flow passage area S2 of the second sub air passage 35b is smaller than the minimum flow passage area S1 of the first sub air passage 35a, and (second sub air passage 35b loss)/(first sub air passage 35a loss) is large. Thus, the measured air-flow amount average is corrected to be large when the air flow pulsates. In this way, the losses of the first and second sub air passage 35a, 35b are adjusted, so that the measured air flow amount is corrected to reach actual air flow amount average even when the air flow pulsates, thereby measuring the air flow mount highly accurately.

(Second Embodiment)

Figure 4:
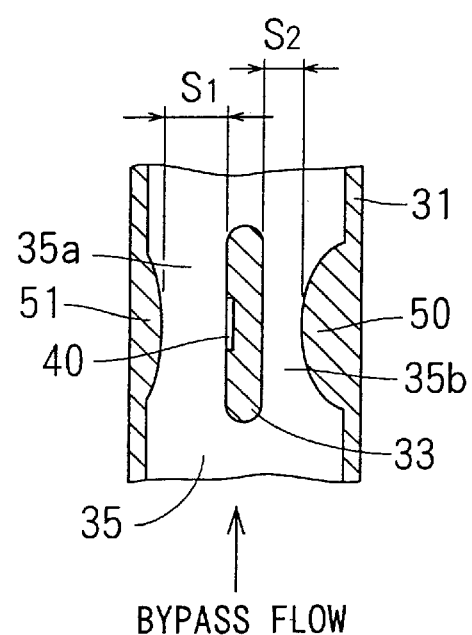
FIG. 4 is a schematic cross-sectional view showing around a thermal flow sensor (second embodiment)

In the second embodiment, as shown in FIG. 4, in addition to the convex 50 formed on the inner wall of the outer pipe 31 forming the second sub air passage 35b, a convex 51 is formed on the inner wall of the outer pipe 31 forming the first sub air passage 35a. The convex 51 works as an air flow resistor. The convex 51 is smaller than the convex 50, and the minimum flow passage area S1 of the first sub air passage 35a is larger than the minimum flow passage area S2 of the second sub air passage 35b. Flow passage loss ratio of the second sub air passage 35b relative to the first sub air passage 35a is adjusted by changing size of the convexes 50, 51 or shapes thereof, so that the measured air-flow amount average is corrected to be large when the air flow pulsates.

(Third Embodiment)

Figure 5:
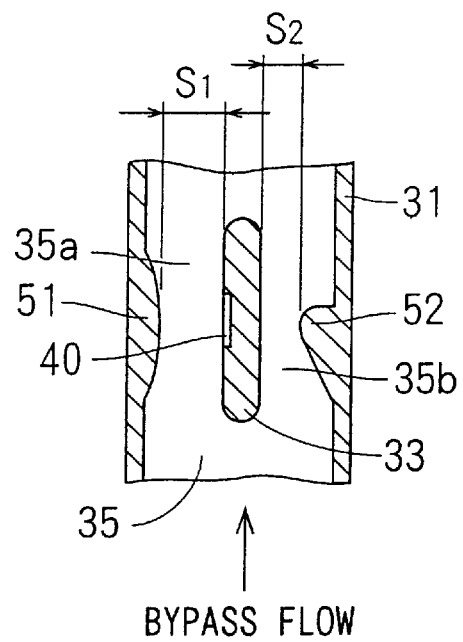
FIG. 5 is a schematic cross-sectional view showing around a thermal flow sensor (third embodiment)

In the third embodiment, as shown in FIG. 5, a convex 52 is formed on the inner wall of the outer pipe 31 forming the second sub air passage 35b. The shape of the convex 52 is different from the shape of the convex 50 in the first and second embodiments. In this case also, since the minimum flow passage area S1 is larger than the minimum flow passage area S2, the measured flow amount average is corrected to large when the air-flow pulsates.

(Fourth Embodiment)

Figure 6:
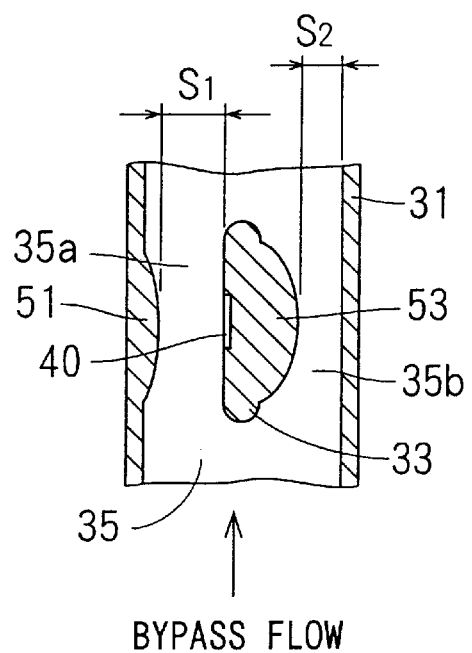
FIG. 6 is a schematic cross-sectional view showing around a thermal flow sensor (fourth embodiment)

In the fourth embodiment, as shown in FIG. 6, a convex 53 is formed on the surface of the separator 33 facing the second sub air passage 35b instead of the convex 50 in the second embodiment and the convex 52 in the third embodiment. In this case also, the minimum flow passage area S1 is larger than the minimum flow passage area S2.

(Fifth Embodiment)

In the fifth embodiment, measured fluid amount average is corrected to be small when the air-flow pulsates, that is different from the first through fourth embodiments.

Figure 7:
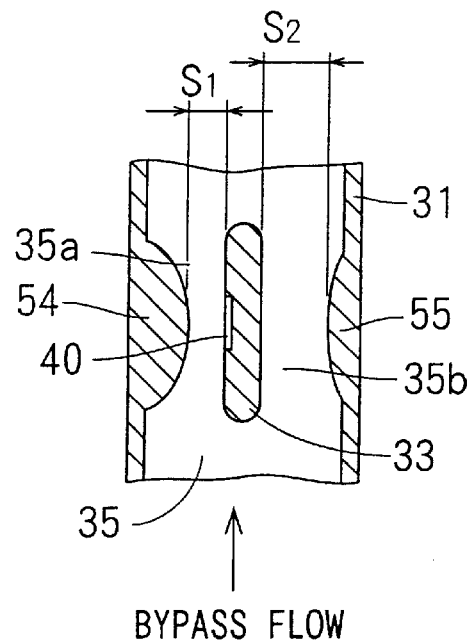
FIG. 7 is a schematic cross-sectional view showing around a thermal flow sensor (fifth embodiment)

When the bypass passage 34 has the same fluid passage length and fluid passage area as in the first through fourth embodiments, the measured fluid amount average might be excessively corrected to be large. Further, due to the shape of fluid passage and a position where the sensor portion is disposed, the measured fluid amount average might be larger than actual fluid amount average. In the fifth embodiment, as shown in FIG. 7, a convex 54 is formed on the inner surface of the outer pipe 31 forming the first sub air passage 35a, and a convex 55 is formed on the inner surface of the outer pipe 31 forming the second sub air passage 35b. The convex 54 is larger than the convex 55, so that the minimum fluid passage area S1 of the first sub air passage 35a is smaller than the minimum fluid passage area S2 of the second sub air passage 35b. Since the flow passage loss of the first sub air passage 35a is larger than the flow passage loss of the second sub air passage 35b, measured fluid amount average when the air-flow pulsates is corrected to be small.

(Sixth Embodiment)

Figure 8:
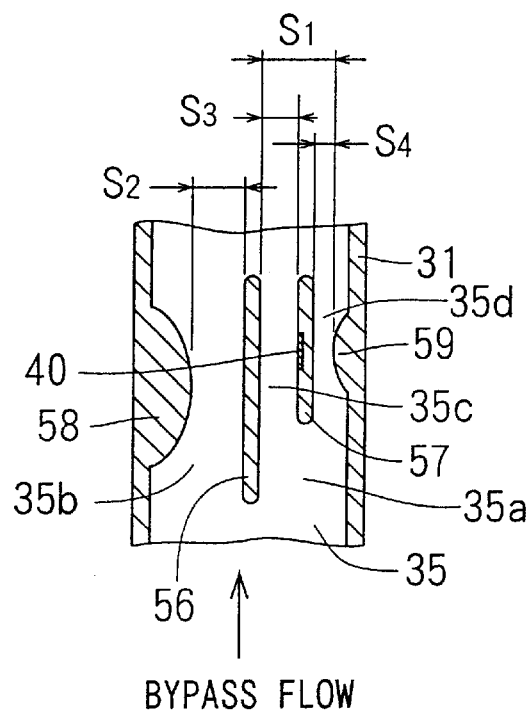
FIG. 8 is a schematic cross-sectional view showing around a thermal flow sensor (sixth embodiment)

In the sixth embodiment, as shown in FIG. 8, first and second separators 56, 57 partitions the upstream side air passage 35 into first through fourth sub air passages 35a, 35b, 35c and 35d. Upstream side end of the first separator 56 is located at upstream side more than upstream side end of the second separator 57. Viewing from the upstream side, the first separator 56 partitions the upstream side air passage 35 into the first and second air passages 35a and 35b. The second separator 57 partitions the first sub air passage 35a into the third and fourth air passages 35c and 35d. The thermal flow sensor 40 is attached to the surface of the second separator 57 facing the third sub air passage 35c. A convex 58 is formed on the inner surface of the outer pipe 31 facing the second sub air passage 35b, and a convex 59 is formed on the inner surface of the outer pipe 31 forming the fourth sub air passage 35d. Thereby, the flow passage loss of the second sub air passage 35b is larger than the flow passage loss of the first sub air passage 35a, and the flow passage loss of the fourth sub air passage 35d is larger than the flow passage loss of the third sub air passage 35c.

Since the correction of measured fluid amount average is performed by double stage, correction amount is larger than that the correction is performed by single stage.

According to the above-described second through sixth embodiments, the convex is formed within the first sub air passage 35a to which the thermal flow sensor 40 faces, and the convex includes a convex curved surface. The first sub air passage 35a is smoothly restricted from the upstream side to the downstream side thereof where the thermal flow sensor 40 is positioned. Thus, even when the air-flow is turbulent, the turbulence of the air-flow is reduced as air flows toward the thermal flow sensor 40. Therefore, detected signal from the thermal flow sensor 40 for constant fluid amount is stabilized at approximately constant value.

(Seventh Embodiment)

Figure 9:
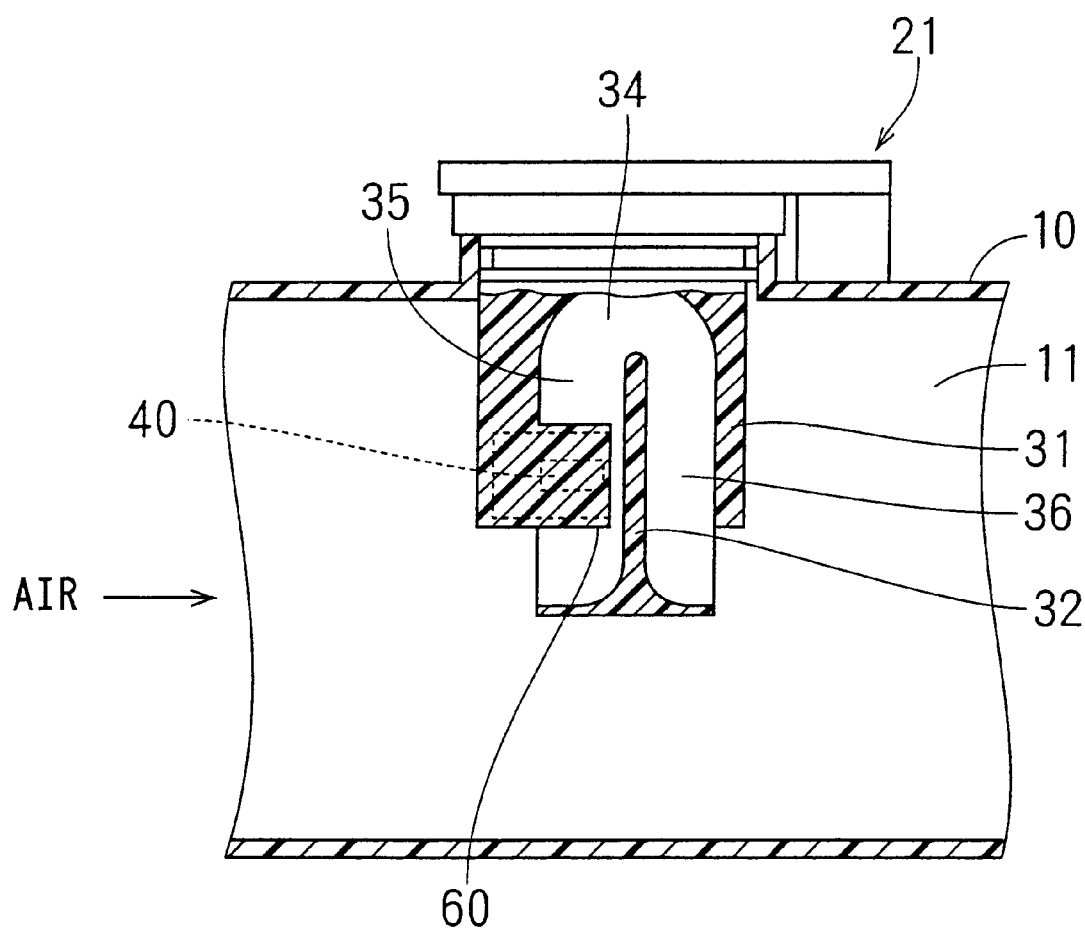
FIG. 9 is a partial cross-sectional view showing an air flow meter (seventh embodiment).

In the seventh embodiment, as shown in FIG. 9, the outer pipe 31 supports a separator 60 to which the thermal flow sensor 40 is attached. The separator 60 partitions the upstream side air passage 35 into two sub air passages.

According to the above-described embodiments, a convex is formed at one or both of two sub air passages partitioned by the separator 60, so that the flow passage losses of the sub air passage in which the thermal flow sensor is provided and the sub air passage in which the thermal flow sensor is not provided are adjusted. Thereby, when the air-flow pulsates, the measured fluid amount average is corrected to be large or small for measuring the air-flow amount more accurately. Further, the convex formed on the inner wall of the fluid passage adjusts the flow passage loss of the sub air passage without changing the shape, the fluid passage length, and the fluid passage area of the bypass passage, so that the measured fluid flow amount average is corrected when the air-flow pulsates. Thus, even when the measured air-flow amount deviates from the actual air-flow amount and the deviation amount changes due to the air-flow pulsation in accordance with the shape of main air-flow passage or position where the sensor portion is disposed, there is no need to change the shape and size of the entire air-flow meter 1.

(Modifications)

According to the above-described embodiments, the convex formed in a smoothly symmetrically or no symmetrically shaped with respect to the air flow direction works as a flow resistor. Alternatively, the convex may be formed in any shape as long as it increases the flow passage loss of the sub air passage.

According to the above-described embodiments, the convex is formed integrally with the inner wall of the fluid passage. Alternatively, the convex may be formed separately from the inner wall. For example, a convex made of metal may be provided at the inner wall.

According to the above-described embodiments, the flow meter unit defines the bypass passage within the air passage 11, and the separator defines the sub air passages within the bypass passage. Alternatively, separators may define a plurality of sub air passages within the air passage without defining a bypass passage.

The present invention is not limited to be used for measuring air-flow amount in a vehicle engine, and may be used for measuring flow amount of fluid flowing through miscellaneous fluid passages.

What is claimed is:

1. A fluid flow amount meter measuring flow amount of fluid flowing through a fluid passage, comprising:
   a fluid passage member forming said fluid passage;
   a separator partitioning said fluid passage into first and second sub fluid passages, said first and second sub fluid passages respectively defining inner walls thereof;
   a thermal flow sensor provided within said first sub fluid passage; and
   a flow passage resistance difference generating member provided at said inner wall of said second sub fluid passage, wherein
   said flow passage resistance difference generating member works as a flow resistor for the fluid flowing through said second sub fluid passages, and flow passage losses of said first and second sub fluid passages are different from each other due to said flow passage resistance difference generating member;

wherein the flow passage loss of said first sub fluid passage is smaller than the flow passage loss of said second sub fluid passage.

2. A fluid flow amount meter according to claim 1 wherein said flow passage resistance difference generating member includes a convex provided on said inner wall.

3. A fluid flow amount meter according to claim 1, wherein the flow passage losses are adjusted to correct an average of measured flow amount of fluid.

4. A fluid flow amount meter measuring flow amount of fluid flowing through a fluid passage, comprising:

a fluid passage member forming said fluid passage;

a flow meter unit forming a bypass passage of which an inlet and an outlet are located within said fluid passage;

a separator partitioning said bypass passage into first and second sub fluid passages, said first and second sub fluid passages respectively defining inner walls thereof;

a thermal flow sensor provided within said first sub fluid passage; and a flow passage resistance difference generating member provided at said inner wall of said second sub fluid passage; wherein said flow passage resistance difference generating member works as a flow resistor for the fluid flowing through said second sub fluid passage, said flow passage losses of said first and second sub fluid passage being different from each other due to said flow passage resistance difference generating member;

wherein the flow passage loss of said first sub fluid passage is smaller than the flow passage loss of said second sub fluid passage.

5. A fluid flow amount meter according to claim 4, wherein said bypass passage is formed in a U-shape arranged substantially perpendicularly to a fluid flow in said fluid passage.

6. A fluid flow amount meter according to claim 4, wherein said separator is supported said inner wall.

7. A fluid flow amount meter according to claim 4, wherein the flow passage loss of said first sub fluid passage is larger than the flow passage loss of said second sub fluid passage.

8. A fluid flow amount meter according to claim 4, wherein said flow passage resistance difference generating member is formed independently from said inner wall.

9. A fluid flow amount meter according to claim 8, said flow passage resistance difference generating member is made of metal.

10. A fluid flow amount meter according to claim 4, wherein the flow passage losses are adjusted to correct an average of measured flow amount of fluid.

11. A fluid flow amount meter measuring flow amount of fluid flowing through a fluid passage, comprising:

a fluid passage member forming said fluid passage;

a separator partitioning said fluid passage into first and second sub fluid passages, said first and second sub fluid passages respectively defining inner walls thereof;

a thermal flow sensor provided with said first sub fluid passage; and means for generating flow passage resistance difference provided at said inner wall of said second sub fluid passage, wherein said means for generating flow passage resistance difference works as a flow resistor for the fluid flowing through said second sub fluid passage, and flow passage losses of said first and second sub fluid passages are different from each other due to said means for generating flow passage resistance difference;

wherein the flow passage loss of said first sub fluid passage is smaller than the flow passage loss of said second sub fluid passage.

12. A fluid flow amount meter according to claim 11, wherein the flow passage losses are adjusted to correct an average of measured flow amount of fluid.

13. A fluid flow amount meter measuring flow amount of fluid flowing through a fluid passage, comprising:

a fluid passage member forming said fluid passage;

a flow meter unit forming a bypass passage of which an inlet and an outlet are located within said fluid passage;

a separator partitioning said bypass passage into first and second sub fluid passages, said first and second sub fluid passages respectively defining innner walls thereof;

a thermal flow sensor provided within said first sub fluid passage; and means for generating flow passage resistance difference provided at said inner wall of said second sub fluid passage; wherein said means for generating flow passage resistance difference works as a flow resistor for the fluid flowing through said second sub fluid passage, and flow passage losses of said first and second sub fluid passages are different from each other due to said means for generating flow passage resistance difference;

wherein the how passage loss of said first sub fluid passage is smaller than the flow passage loss of said second sub fluid passage.

14. A fluid flow amount meter according to claim 13, wherein the flow passage losses are adjusted to correct an average of measured flow amount of fluid.

* * * * *